(12) United States Patent
Jia et al.

(10) Patent No.: US 11,923,696 B2
(45) Date of Patent: Mar. 5, 2024

(54) PASSIVE ADAPTER FOR MAGNETIC INDUCTIVE WIRELESS CHARGING

(71) Applicant: Google LLC, Mountain View, CA (US)

(72) Inventors: Liang Jia, Palo Alto, CA (US); Srenik Suresh Mehta, Fremont, CA (US); Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 476 days.

(21) Appl. No.: 17/274,548

(22) PCT Filed: Feb. 12, 2020

(86) PCT No.: PCT/US2020/017862
§ 371 (c)(1),
(2) Date: Mar. 9, 2021

(87) PCT Pub. No.: WO2021/162685
PCT Pub. Date: Aug. 19, 2021

(65) Prior Publication Data
US 2022/0115916 A1  Apr. 14, 2022

(51) Int. Cl.
*H02J 50/50* (2016.01)
*H02J 7/00* (2006.01)
*H02J 50/12* (2016.01)

(52) U.S. Cl.
CPC .......... *H02J 50/50* (2016.02); *H02J 7/00047* (2020.01); *H02J 50/12* (2016.02); *H02J 2310/22* (2020.01)

(58) Field of Classification Search
CPC .......... H02J 50/50; H02J 50/12; H02J 7/0047; H02J 7/00047; H02J 2310/22;
(Continued)

(56) References Cited

U.S. PATENT DOCUMENTS 10,374,464 B2    8/2019  Kurz et al.
10,804,748 B2   10/2020  Wu et al.
(Continued)

FOREIGN PATENT DOCUMENTS

DE    102017217198    3/2019

OTHER PUBLICATIONS

"International Preliminary Report on Patentability", Application No. PCT/US2020/017862, dated Aug. 11, 2022, 8 pages.
(Continued)

*Primary Examiner* — Paul Dinh
(74) *Attorney, Agent, or Firm* — Colby Nipper PLLC

(57) ABSTRACT

This document describes a passive adapter for wireless charging of an electronic device and associated methods and systems. The described passive adapter includes two coils connected by a capacitor and separated by a core material that prevents mutual coupling between the coils. These two coils may have differing sizes, such that one coil can size-match to a transmitter coil of an existing wireless charger and the second coil can size-match to a smaller (or larger) receiver coil in a wireless-power receiver to charge a battery of the wireless-power receiver. In aspects, these two coils may be separated by a distance that enables the passive adapter to act as a passive repeater by bridging a space between the transmitter coil and the receiver coil.

20 Claims, 8 Drawing Sheets

(58) Field of Classification Search
CPC ..... H01F 27/366; H01F 38/14; H04B 5/0037; H04B 5/0081
USPC .......................................................... 320/108
See application file for complete search history.

(56) References Cited

U.S. PATENT DOCUMENTS

| | | | |
|---|---|---|---|
| 11,418,062 B2* | 8/2022 | Tang | ........................ H01F 27/28 |
| 2007/0145830 A1* | 6/2007 | Lee | ........................ G01V 3/104 |
| | | | 307/135 |
| 2010/0141369 A1 | 6/2010 | Mori | |
| 2010/0295652 A1 | 11/2010 | Mori | |
| 2011/0115430 A1 | 5/2011 | Saunamaki | |
| 2013/0119929 A1 | 5/2013 | Partovi | |
| 2013/0234509 A1 | 9/2013 | Ichikawa et al. | |
| 2013/0270921 A1* | 10/2013 | Boys | ........................ H02J 50/90 |
| | | | 307/104 |
| 2014/0084857 A1* | 3/2014 | Liu | ........................ H02J 50/402 |
| | | | 320/108 |
| 2016/0163451 A1* | 6/2016 | Wang | ................ H01F 27/2804 |
| | | | 336/200 |
| 2018/0032730 A1* | 2/2018 | Miller | ................... G06F 21/565 |
| 2018/0076668 A1* | 3/2018 | Parimi | .................... H02J 50/40 |
| 2019/0270388 A1 | 9/2019 | Ogawa et al. | |
| 2019/0334391 A1 | 10/2019 | Qi et al. | |
| 2019/0379240 A1* | 12/2019 | Liu | ........................ H01F 38/14 |
| 2020/0096774 A1* | 3/2020 | Trail | ........................ G06F 1/163 |
| 2020/0303940 A1* | 9/2020 | Harris | ................... H02J 50/005 |
| 2021/0044150 A1* | 2/2021 | Tang | ........................ H02J 50/12 |
| 2021/0099019 A1* | 4/2021 | Lee | ........................ H02J 7/02 |
| 2021/0099026 A1 | 4/2021 | Larsson et al. | |
| 2021/0193371 A1 | 6/2021 | Saadat | |

OTHER PUBLICATIONS

"International Search Report and Written Opinion", Application No. PCT/US2020/017862, dated Jul. 24, 2020, 14 pages.
"MagSafe", Retrieved at: https://www.apple.com/shop/accessories/all/magsafe—on May 30, 2023, 4 pages.
"Non-Final Office Action", U.S. Appl. No. 17/176,685, dated Mar. 16, 2022, 13 pages.
"Notice of Allowance", U.S. Appl. No. 17/176,685, dated Jun. 24, 2022, 9 pages.
"Wireless Power Consortium—Qi 2", Retrieved at: https://www.wirelesspowerconsortium.com/—on May 30, 2023, 2 pages.

* cited by examiner

US 11,923,696 B2

PASSIVE ADAPTER FOR MAGNETIC INDUCTIVE WIRELESS CHARGING

RELATED APPLICATION(S)

This application is a national stage entry of International Application No. PCT/US2020/017862, filed Feb. 12, 2020, the disclosure which is incorporated herein by reference in its entirety.

BACKGROUND

The use of wireless charging for mobile phones is growing rapidly. The Wireless Power Consortium (WPC) has developed an open interface standard, referred to as Qi, which has been implemented into a majority of the mobile phones today that use wireless charging. Qi standards provide high-efficiency inductive charging at 5-15 Watts of power at low frequencies (e.g., 87-205 kHz) over distances of up to 4 cm. Efficiency is highest when a wireless charger has a transmitting inductive coil that substantially matches the size of a receiving inductive coil at the mobile phone and the coils are aligned. Misalignment and mismatched sizes of the coils significantly reduces the efficiency of power transfer.

The market for other consumer electronics, such as wireless electronic devices with small form factors, are also growing. One of the fastest growing markets is wearable technology, which includes smartwatches, smart glasses, wireless earbuds, and so forth. These wearable devices have a small form factor, which restricts the size of a receiving inductive coil that can be implemented for wireless charging. Such a small coil results in poor coupling and efficiency when combined with existing wireless chargers, which include a transmitter coil having a size fixed by the Qi standards. In addition, due to the small form factor, many of these wearable devices include metal housings that provide a more premium "look and feel" of the product along with high durability, but the metal housing heats up due to foreign-object heating from the larger transmitter coil. Designing a new wireless charger unique to each wearable device may not be economical and may not align with the Qi standards, but existing chargers are not compatible with many of these wearable devices. Poor power-transfer efficiency and increased foreign-object heating of wirelessly charging small-form-factor devices being wirelessly charged using traditional techniques result in a poor user experience.

SUMMARY

This document describes a passive adapter for magnetic inductive wireless charging. The passive adapter includes two coils electrically connected by a capacitor and separated by a core material that prevents mutual coupling between the coils. These two coils may have differing sizes (e.g., width, outer diameter, number of coil turns, perimeter, etc.), such that one coil can be size-matched to a transmitter coil of an existing wireless charger and the second coil can be size-matched to a smaller (or larger) receiver coil in a wireless-power receiver to charge a battery of the wireless-power receiver.

The passive adapter solves the problem of mismatched coil sizes between transmitter and receiver coils and enables charging of small-form-factor devices (e.g., wearable technology) using existing wireless chargers that are designed for medium-sized devices such as smartphones. The passive adapter significantly improves magnetic coupling and power-transfer efficiency between the transmitter and receiver coils, in comparison to existing solutions, and reduces the effects of foreign-object heating of metal housings of the small-form-factor devices. Additionally, the passive adapter can be used to enable high-efficiency wireless charging according to Qi standards of distances greater than 4 cm.

This summary is provided to introduce simplified concepts concerning a passive adapter for magnetic inductive wireless charging, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a passive adapter for wireless charging are described in this document with reference to the following drawings. The same numbers are used throughout the drawings to reference like features and components.

DETAILED DESCRIPTION

Overview

Figure 1:
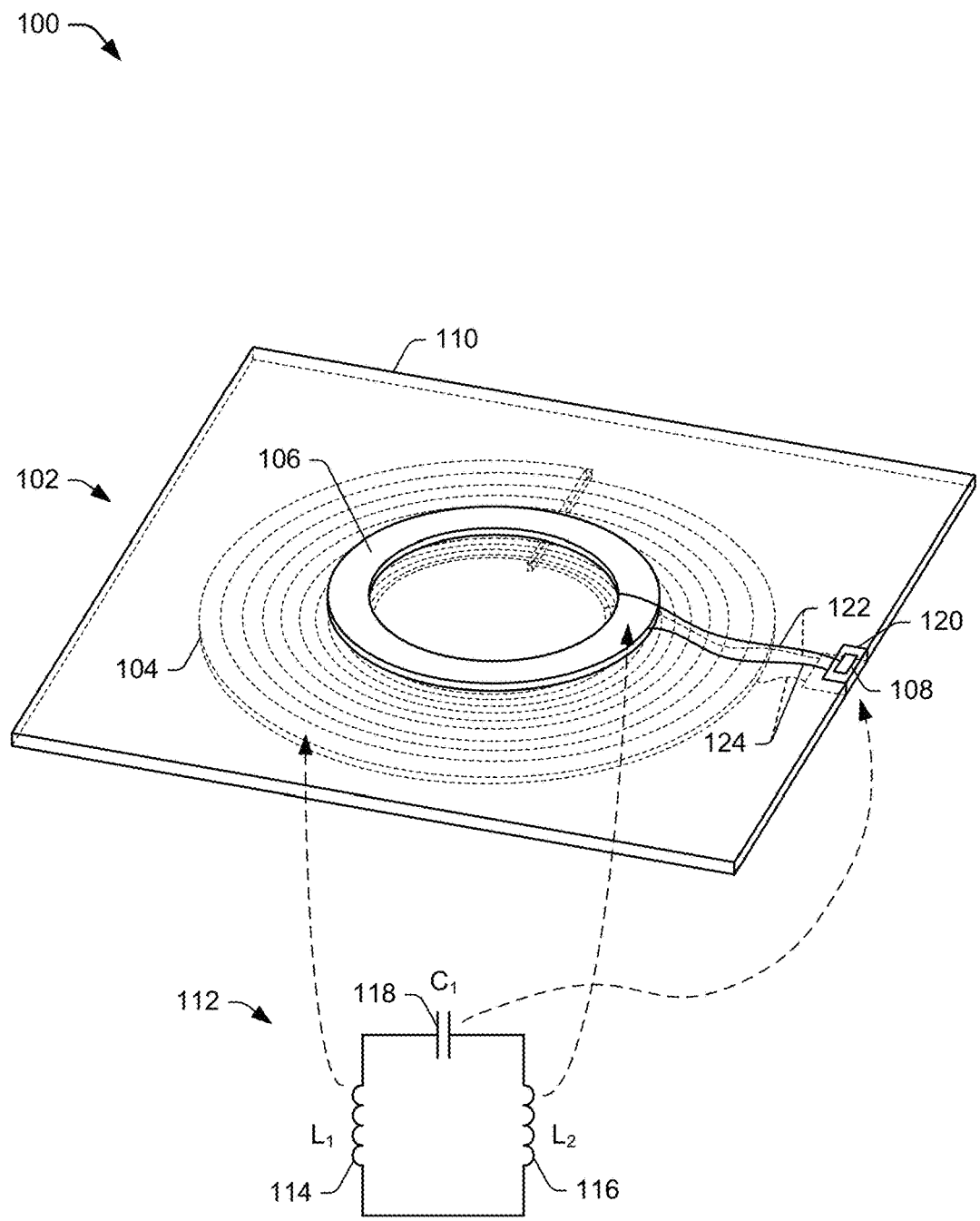
FIG. 1 illustrates a top front perspective view of the passive adapter from FIG. 1.

Many electronic devices, such as wearable devices, have a small form factor that is not compatible with existing magnetic inductive wireless chargers, such as chargers approved by Qi standards. This incompatibility (e.g., poor coupling) is generally due to a size mismatch between a receiving inductive coil in the electronic device and a transmitting inductive coil in the wireless charger. In some cases, the incompatibility may be due to a distance between the electronic device and the wireless charger causing poor coupling.

In aspects, a passive adapter for magnetic inductive wireless charging is disclosed. The passive adapter includes a first coil, a second coil, and a capacitor. The first coil is wound to have a first size and is configured to generate an electric current based on exposure of the first coil to a first magnetic field. The capacitor is electrically connected to the first coil. The capacitor is configured to store energy based on the electric current generated by the first coil. The second coil is electrically connected to the capacitor and the first coil. The second coil is wound to have a second size that is different than the first size of the first coil. In addition, the second coil is configured to generate a second magnetic field based on the stored energy from the capacitor. The second magnetic field is generated to transfer the energy to a receiver coil at a device to wirelessly charge the device.

In aspects, a system for magnetic inductive wireless charging of an electronic device is disclosed. The system includes a passive adapter and a receiver coil. The passive adapter includes first and second coils electrically connected via a capacitor to form a resonant circuit. The passive adapter is configured to receive, at the first coil, energy via a magnetic field. The energy induces an electric current in the first coil. The passive adapter is further configured to temporarily store energy in the capacitor based on the electric current induced in the first coil, pass the stored energy from the capacitor to the second coil, and generate, at the second coil, an additional magnetic field based on the energy passed to the second coil. The receiver coil is magnetically coupled to the second coil. The receiver coil is configured to receive, via the additional magnetic field, additional energy that induces a second electric current in the receiver coil. The second electric current is usable to charge a load.

In aspects, a system for magnetic inductive wireless charging of an electronic device is disclosed. The system includes a passive adapter and a receiver coil. The passive adapter includes first and second coils connected via a capacitor to form a resonant circuit. The passive adapter is configured such that the first coil is operable to induce an electric current therein on the basis of a magnetic field at the first coil, temporarily store energy in the capacitor based on the electric current induced in the first coil, pass the stored energy from the capacitor to the second coil, and generate, at the second coil, an additional magnetic field based on the energy passed to the second coil. The receiver coil is positioned proximate to the second coil. The receiver coil is configured to generate a second electric current based on the additional magnetic field. The second electric current is usable to charge a load.

In some aspects, a system for magnetic inductive wireless charging of an electronic device is disclosed. The system includes a wireless-power transmitter, a wireless-power receiver, and a passive adapter. The wireless-power transmitter includes a first inductive coil for generating a first magnetic field based on an alternating current running through the first coil. The wireless-power receiver includes a second inductive coil for generating an electric current, based on exposure to a magnetic field, to charge a load. The second inductive coil has a substantial size mismatch relative to the first inductive coil. The passive adapter is positioned between the first inductive coil and the second inductive coil. The passive adapter includes a third inductive coil, a capacitor, a fourth inductive coil, and a core material. The third inductive coil is aligned with the first inductive coil and substantially matches a size of the first inductive coil. The third inductive coil is configured to generate energy based on exposure to the first magnetic field generated by the first inductive coil. The capacitor is connected to the third inductive coil and is configured to temporarily store the energy generated by the third inductive coil. The fourth inductive coil is substantially aligned with the second inductive coil and substantially matches a size of the second inductive coil. The fourth inductive coil is configured to receive the energy stored by the capacitor and generate a second magnetic field based on the received energy for the second inductive coil to receive. The core material is positioned between the third inductive coil and the fourth inductive coil. The core material is configured to prevent mutual coupling between the third and fourth inductive coils.

These are but a few examples of how the described techniques and devices may be used to enable a passive adapter for magnetic inductive wireless charging. Other examples and implementations are described throughout this document. The document now turns to an example device, after which example systems are described.

Example Device

FIG. 1 illustrates a top front perspective view 100 of an example implementation of a passive adapter 102 for magnetic inductive wireless charging. The passive adapter 102 includes two coils, e.g., coil 104 and coil 106, electrically connected to each other by a capacitor 108 (or a bank of capacitors) and separated by a layer of highly-permeable material, e.g., core material 110. With this structure, the passive adapter 102 forms a resonant circuit 112, also referred to as an LC tank, which is a circuit containing both an inductor and a capacitor to provide both inductive and capacitive reactance. The resonant circuit 112 has a resonant frequency, which is the frequency at which the inductive and capacitive reactances are the same, providing a substantially zero impedance. Thus, the amount of power transferred to the passive adapter 102, at the resonant frequency of the passive adapter 102, is essentially equal to the amount of power transferred out of the passive adapter 102. Here, the coil 104 acts as an inductor $L_1$ 114, the coil 106 acts as an inductor $L_2$ 116, and the capacitor 108 acts as a capacitor $C_1$ 118.

The coil 104 may be an inductive coil wound in a shape that substantially matches a geometry of an inductive transmitter coil of an existing wireless-charging device, such as those used to wirelessly charge a smartphone. The geometry of the coil 104 and the inductive transmitter coil may be any suitable geometry, including a disk-like shape, a ring-like shape, a rectangular shape with rounded corners, and so forth. In some implementations, the geometry may be cylindrical to enable for inductive resonance wireless charging.

The coil 106 may be an inductive coil that is wound in a shape that substantially matches a geometry of an inductive receiver coil of a receiver device to be charged. The geometry of the coil 106 and the inductive receiver coil may be any suitable geometry, including a disk-like shape, a ring-like shape, a rectangular shape with rounded corners, a frame shape (e.g., shaped to fit a frame of spectacles), or even a cylindrical shape. The shape and/or size of the coil 106 may be substantially different (e.g., larger, smaller, or different geometry) than that of the coil 104. For example, the coil 106 may be larger or smaller by a difference of ten or more millimeters in diameter, width, length, etc. In another example, the coil 106 may have a different shape, such as a rectangular shape with rounded corners when the coil 104 has a disk-like shape.

The coil 104 is connected to the coil 106 via the capacitor 108 to form an LC circuit. The capacitor 108 may be placed on a flexible printed circuit board 120 (flexible PCB 120), which is connected to both coils 104, 106 via wires 122 and 124 respectively. For example, the capacitor 108 may be connected to coil 104 and coil 106 via wires 122. Additional wires 124 may be used to connect the coil 104 to the coil 106 to complete the resonant circuit 112.

The core material 110 is positioned between the coils 104, 106 to separate the coils 104, 106. The core material 110 has high permeability, such as ferrite, to prevent mutual coupling between the coils 104, 106. By placing the core material 110 between the coils 104, 106, magnetic flux does not pass from one coil to the other because the core material shunts it. To prevent mutual coupling between the coils 104, 106, the core material 110 has a thickness within a range of approximately 0.5 millimeters to approximately 2.0 millimeters. In some implementations, the coil 106 may have its own core material (not shown), which may provide a desired inductance for the coil 106. For example, if the core material of the coil 106 a higher permeability than that of the core material 110, the coil 106 may have a higher inductance. Alternatively, the core material 110 may have a higher permeability than that of the core material of the coil 106, which may also provide a higher inductance.

In the illustrated example, the coils 104, 106 are wired together around an outside edge of the core material. Alternatively, a wired connecting the coils 104, 106 may pass through a small hole (not shown) in the core material 110 without significant adverse effects to operation of the system.

Figure 2:
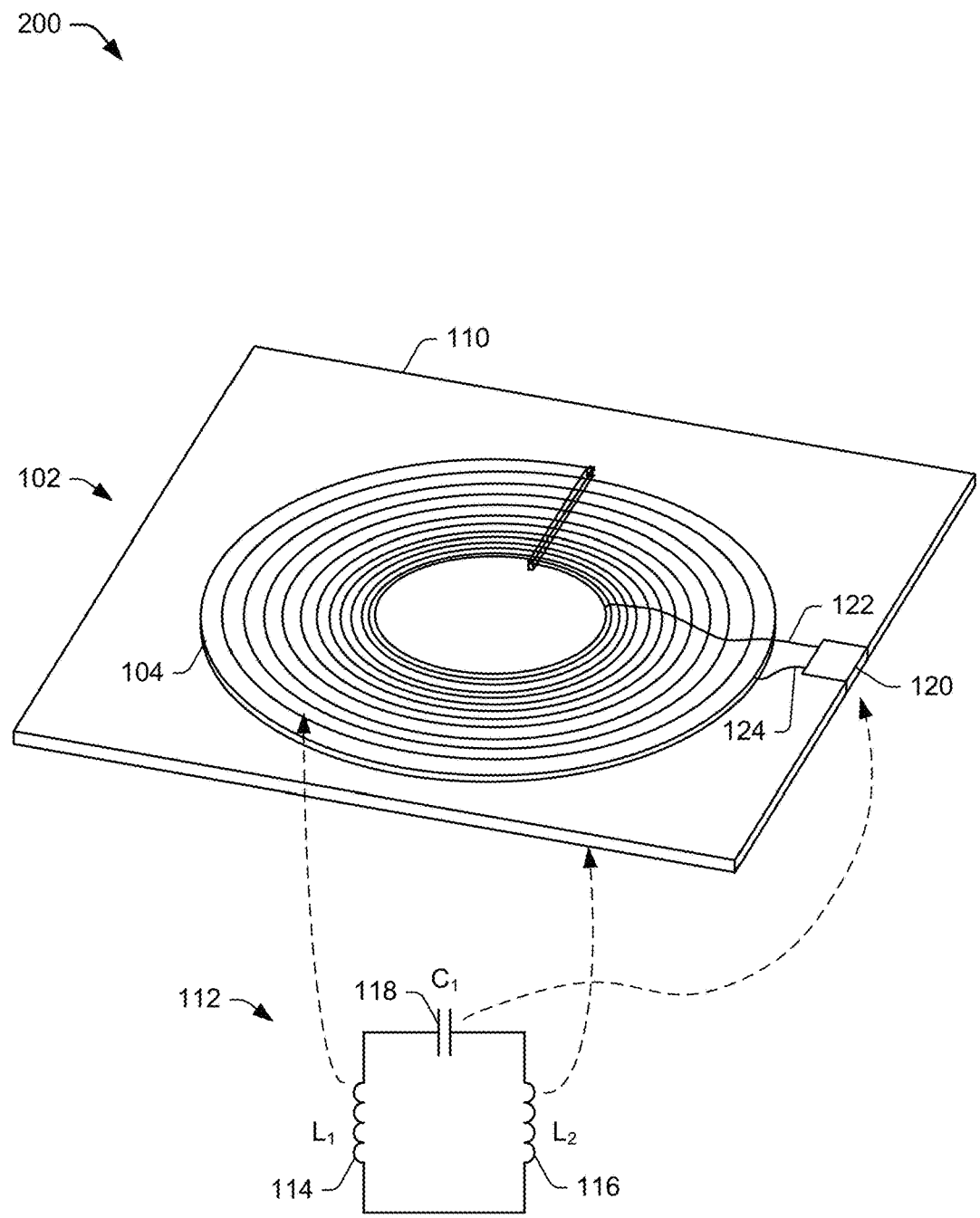
FIG. 2 illustrates a bottom front perspective view of an example implementation of the passive adapter for magnetic inductive wireless charging.

FIG. 2 illustrates a bottom front perspective view 200 of the passive adapter 102 from FIG. 1. As illustrated, the coil 104 is positioned on the bottom side of the core material 110 and forms the inductor $L_1$ 114. The inductor $L_2$ 116 is formed by the coil 106 (not shown in FIG. 2) positioned on the opposing side of the core material 110. The PCB 120 is connected to the coil 104 via wires 122 and 124.

Figure 3:
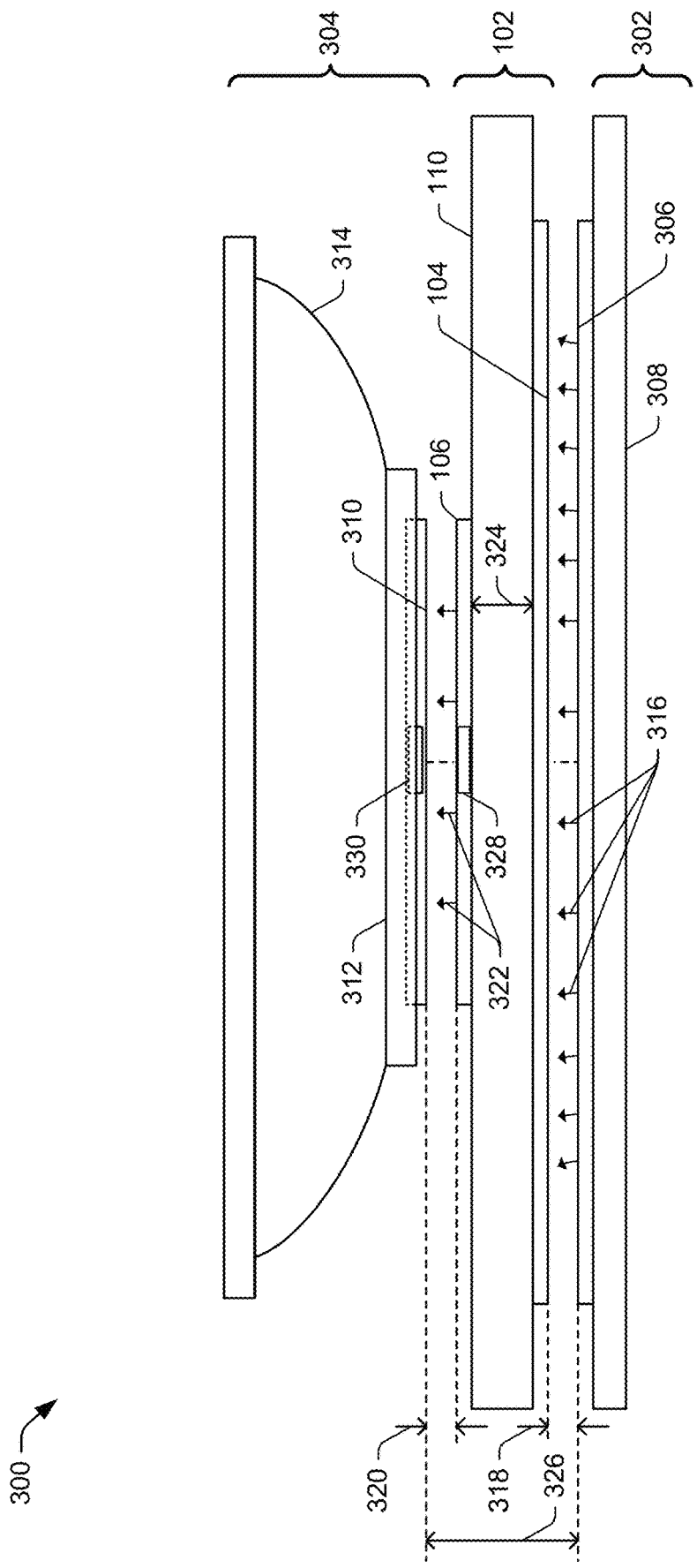
FIG. 3 illustrates a layer stack representing an example system for magnetic inductive wireless charging of an electronic device, using a passive adapter.

FIG. 3 illustrates a layer stack representing an example system 300 for magnetic inductive wireless charging of an electronic device, using a passive adapter. The system 300 includes the passive adapter 102 positioned between a wireless-power transmitter 302, such as a wireless-charging base, and a wireless-power receiver 304, such as a smartwatch. The wireless-power transmitter 302 includes, among other components, a transmitter coil 306 and a shielding material 308, such as ferrite or other highly-permeable material. The wireless-power receiver 304 includes, among other components, a receiver coil 310, a shielding material 312, and a housing 314.

The wireless-power transmitter 302 drives an alternating current (AC current) through the transmitter coil 306 to generate an electromagnetic field, such as magnetic field 316. Existing systems that use inductive wireless charging place the wireless-power receiver 304 directly on top of the wireless-power transmitter 302. Typically, the receiver coil 310 in the wireless-power receiver 304 substantially matches the transmitter coil 306 in size (e.g., outer diameter), which allows for high-efficiency power transfer. However, as illustrated in FIG. 3, the receiver coil 310 of the wireless-power receiver 304 is significantly smaller in diameter (width in horizontal direction) than the transmitter coil 306 of the wireless-power transmitter 302. Placing such a small receiver device directly on top of the transmitter 302 may result in foreign-object heating of the housing 314 of the wireless-power receiver 304 because the shielding material 312 is too small to shield the housing 314 from magnetic flux of the magnetic field 316. Further, the efficiency of such a small receiving coil (e.g., receiver coil 310) coupling with the transmitter coil 306 may be significantly poor, e.g., approximately 40% or lower.

The passive adapter 102 is placed between the wireless-power transmitter 302 and the wireless-power receiver 304. The coil 104 of the passive adapter substantially matches the size of the transmitter coil 306, such that the coil 104 can be aligned with the transmitter coil 306 for high-efficiency power transfer. A distance 318 between the transmitter coil 306 and the coil 104 may be minimal, such as approximately 0.5 mm or less. A distance 320 between the coil 106 and the receiver coil 310 may be similarly minimal. The magnetic field 316 passes energy to the coil 104 and induces an electric current in the coil 104. The coil 104 then passes the energy to the capacitor 108 (shown in FIG. 1) for temporary storage. The capacitor 108 then passes the stored energy to the coil 106, which causes the coil 106 to generate a magnetic field 322. The receiver coil 310 receives energy from the magnetic field 322, which drives an electric current in the receiver coil 310 and allows the wireless-power receiver 304 to charge a load. Note that the magnetic field 322 generated by the coil 106 of the passive adapter is smaller in width (horizontal direction) than the magnetic field 316 generated by the transmitter coil 306 of the wireless-power transmitter 302. This smaller magnetic field 322 provides a better match to the receiver coil 310 and reduces the likelihood of foreign-object heating of the housing 314 of the wireless-power receiver 304.

The core material 110 is sufficiently permeable and thick (thickness 324) to shunt magnetic flux from passing from the transmitter coil 306 to the housing 314 of the wireless-power receiver 304. The core material 110 also shunts magnetic flux from passing from the coil 104 to the coil 106 or the housing 314 of the wireless-power receiver 304. In implementations, the thickness 324 of the core material 110 is within a range of approximately 0.5 mm to approximately 2.0 mm.

Using the passive adapter 102 with existing systems enables the efficiency of wireless-power transfer to small-form-factor devices to reach levels above 70%, which is a significant improvement over existing systems that do not use an adapter. The passive adapter 102 can also substantially fill a space 326 between the wireless-power transmitter 302 and the wireless-power receiver 304 when the wireless-power receiver 304 is not or cannot be placed adjacent to the wireless-power transmitter 302. In aspects, the core material 110 can be made thicker to bridge a larger space between the transmitter coil 306 and the receiver coil 310. For example, the core material 110 may have a thickness of one to several inches. Alternatively, a spacer (not shown) may be positioned between the coil 106 and the core material 110 (or between the core material 110 and the coil 104) to bridge the space 326 between the wireless-power transmitter 302 and the wireless-power receiver 304 without increasing the thickness 324 of the core material 110. The spacer may be formed from any suitable material, such as plastic. If the space 326 between the wireless-power transmitter 302 and the wireless-power receiver 304 is sufficiently large so as to prevent mutual coupling between the transmitter coil 306 and the receiver coil 310, then the core material 110 may be plastic or other material that has a low permeability.

In addition, a magnet 328 may be positioned in the center of the coil 106. An additional magnet, such as magnet 330, may be positioned in the center of the receiver coil 310. The magnet 330 can couple to the magnet 328 during placement of the wireless-power receiver 304 to help align the receiver coil 310 with the coil 106.

Figure 4:
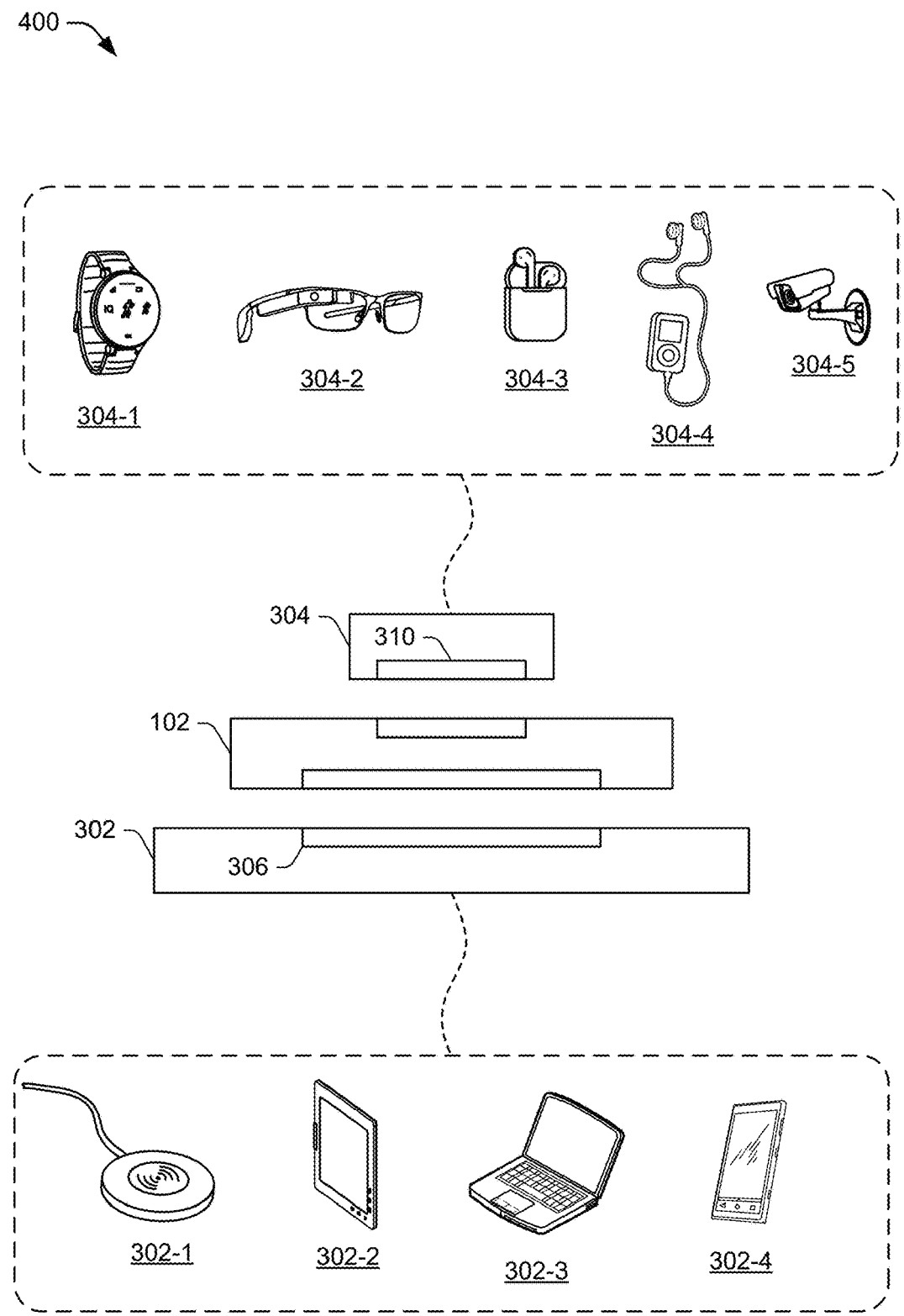
FIG. 4 illustrates an example system for magnetic inductive wireless charging of a smaller electronic device, using a passive adapter.

FIG. 4 illustrates an example implementation 400 of a system for magnetic inductive wireless charging of an electronic device, using a passive adapter. The wireless-power transmitter 302 is illustrated with a variety of example devices, including a charger base 302-1, a tablet 302-2, a laptop 302-3, and a smartphone 302-4. The wireless-power transmitter 302 can also include other devices capable of implementing wireless charging, such as desktop computers, gaming systems or consoles, audio systems, automobiles, track pads, drawing pads, netbooks, e-readers, and some home appliances.

The wireless-power receiver 304 is illustrated with a variety of example devices, including a computing watch 304-1 (e.g., smartwatch), computing spectacles 304-2 (e.g., smart glasses), an electronic earbuds case 304-3, a portable audio player 304-4 (e.g., mp3 player), and a security camera 304-5. The wireless-power receiver 304 can also include other devices with a small form factor, such as small wireless phones, electronic toothbrushes, electronic razors, drones, wireless gaming controllers, remote controls, digital cameras, and other small battery-powered devices.

In one example using the passive adapter 102, the smartphone 302-4 can charge the computing watch 304-1. In another example, the laptop 302-3 can be used with the passive adapter 102 to charge the computing spectacles 304-2 or the electronic earbuds case 304-3. With the passive adapter 102, the tablet 302-2 can be used to charge the portable audio player 304-4. Accordingly, the wireless-power receiver 304 can be charged by not only the charger base 302-1 but other devices as well. Using the passive adapter 102, any suitable device can be implemented as the wireless-power transmitter 302 to transfer power to, and charge a battery of, any suitable device implemented as the wireless-power receiver 304.

Figure 5:
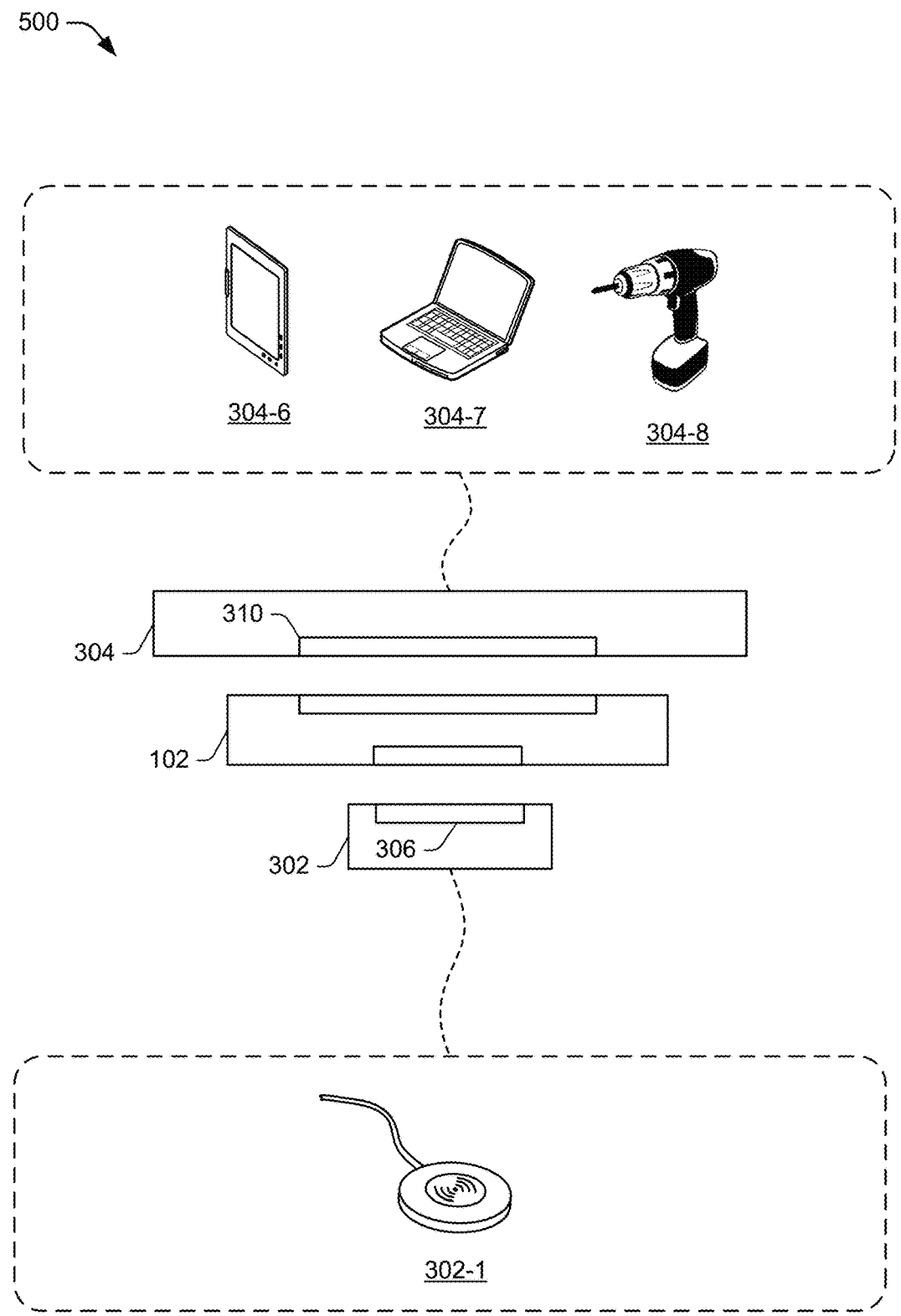
FIG. 5 illustrates an example system for magnetic inductive wireless charging of a larger electronic device, using a passive adapter.

Alternatively, consider FIG. 5, which illustrates an example implementation 500 for magnetic inductive wireless charging of a larger electronic device, using a passive adapter. Here, the passive adapter 102 is used to enable the wireless-power transmitter 302-1 to transmit power to a larger form factor device. For example, the charger base 302-1 may be sized appropriately to match a coil size of a smartphone, which may be too small for coupling to a larger receiver coil 310 of a larger wireless-power receiver 304, such as a tablet 304-6, a laptop 304-7, or a cordless power tool 304-8. The wireless-power receiver 304 in the implementation 500 can also include other devices capable of implementing wireless charging, such as gaming systems, drones, portable speakers, track pads, drawing pads, netbooks, e-readers, and so forth. Accordingly, the passive adapter 102 can be used to enlarge (widen in the horizontal direction) the magnetic field generated by the wireless-power transmitter 302 to increase the efficiency of transferring power to the wireless-power receiver 304, which has a receiver coil 310 that is significantly larger than the transmitter coil 306 (e.g., the receiver coil 310 having a diameter greater than a tolerance of approximately 10 mm in comparison to a diameter of the transmitter coil 306).

Figure 6:
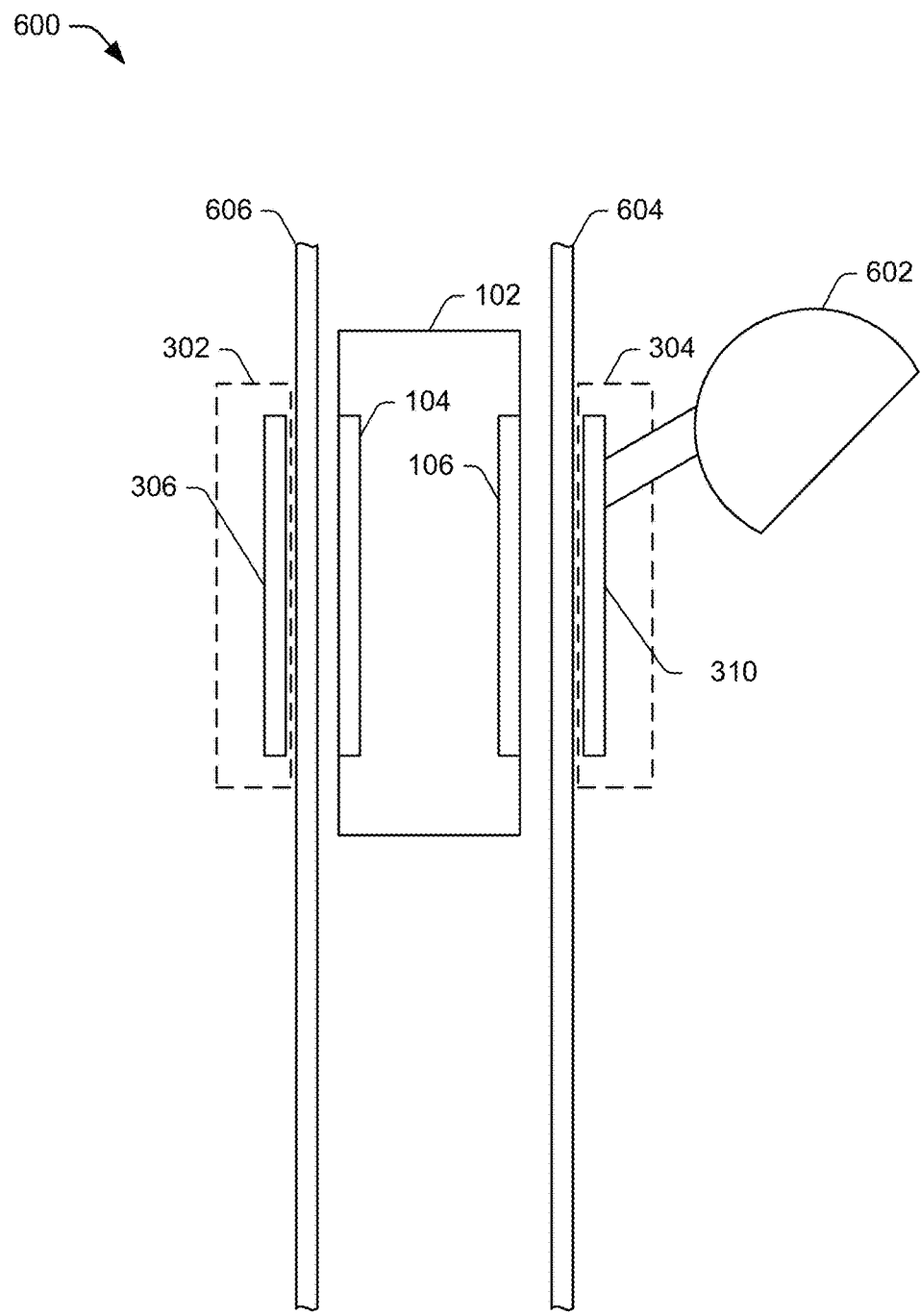
FIG. 6 illustrates an example layer stack of an example system using the passive adapter to wirelessly charge an electronic device at a distance.

FIG. 6 illustrates a layer stack of an example implementation 600 using the passive adapter 102 to wirelessly charge an electronic device at a distance. In this example, a wireless security camera 602 is place on the outside of a house, such as on the exterior of a window that has two windowpanes 604, 606. Placing the wireless-power transmitter 302 on the inside of the window leaves too much distance between the wireless-power transmitter 302 and the wireless-power receiver 304 to efficiently charge a battery of the camera 602 according to Qi protocol. Therefore, the passive adapter 102 can be placed between the windowpanes 604, 606 to act as a repeater between the wireless-power transmitter 302 and the wireless-power receiver 304. Depending on the distance between the windowpanes 604, 606, the core material (e.g., core material 110 from FIG. 1) between the coils 104, 106 may be plastic or other low-cost material. For example, if the coils 104, 106 are separated by a distance that prevents mutual coupling between the coils 104, 106, then a high-permeability material may not be necessary for the core material 110 and, instead, a suitable low-permeability material such as plastic may be used for the core material 110.

Further, because the passive adapter 102 is passive (e.g., it does not use any active switch or controller), it can easily be built into a window between the windowpanes 604, 606 to bridge the space between the wireless-power transmitter 302 and the wireless-power receiver 304. The coils 104, 106 of the passive adapter 102 are not required to perfectly match the transmitter coil 306 and the receiver coil 310, respectively. Rather, a small amount of deviation, such as a tolerance within a range of approximately 5 to 10 mm, may occur without losing a significant amount of efficiency.

Figure 7:
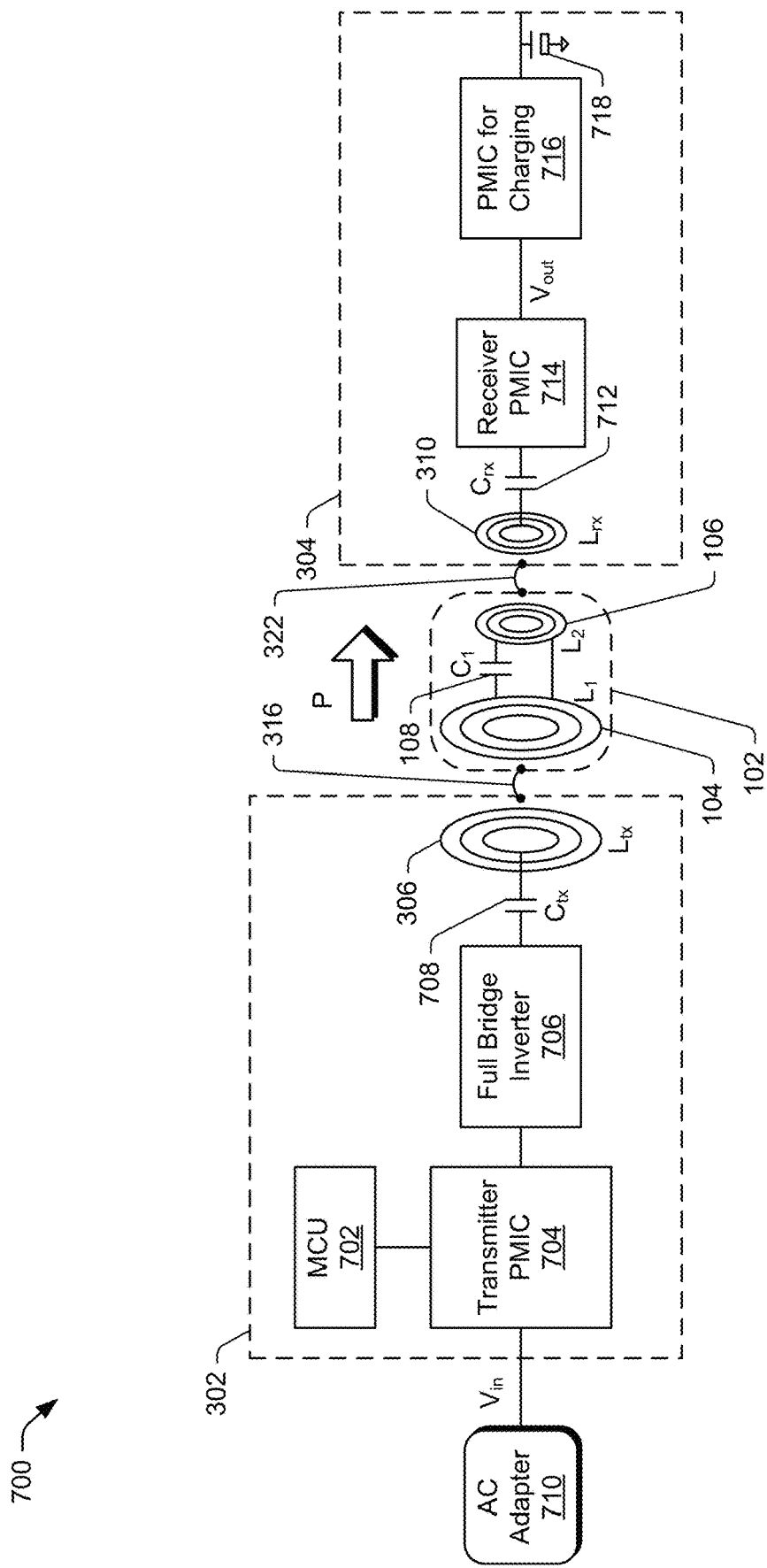
FIG. 7 illustrates a block diagram illustrating an example system using a passive adapter for wireless charging of a load.

FIG. 7 illustrates a block diagram illustrating an example system 700 using a passive adapter for wireless charging of a load. The wireless-power transmitter 302 includes a microcontroller unit (MCU) 702 connected to a transmitter power management integrated circuit (PMIC) 704, which is connected to a full-bridge inverter circuit 706. The full-bridge inverter circuit 706 is connected to one or more capacitors, such as capacitor $C_{tx}$ 708. The capacitor $C_{tx}$ 708 is connected to a transmitter coil $L_{tx}$, such as the transmitter coil 306. The system 700 includes an AC adapter 710 that provides an input voltage $V_{in}$, which is usable by the transmitter PMIC 704 and the MCU 702 to manage power driven to the transmitter coil 306. The full-bridge inverter circuit 706 converts a DC input supply voltage (e.g., input voltage $V_{in}$) into symmetric AC voltage of a desired magnitude and frequency. The resultant AC voltage is output to the capacitor $C_{tx}$ 708, which stores energy from the AC voltage output by the full-bridge inverter circuit 706 and passes the energy to the transmitter coil $L_{tx}$ 306.

The transmitter coil $L_{tx}$ 306 generates a magnetic field 316 and couples to the coil $L_1$ 104 of the passive adapter 102 to transmit energy to the coil $L_1$ 104. The magnetic field 316 induces an electric current in the coil $L_1$, which passes energy to the capacitor $C_1$ 108 by charging the capacitor $C_1$ 108 with a voltage. The capacitor $C_1$ 108 temporarily stores the energy and then passes the energy to the coil $L_2$ 106. The coil $L_2$ 106 generates another magnetic field 322 based on the energy passed by the capacitor $C_1$ 108 and couples to the receiver coil $L_{rx}$ 310.

The receiver coil $L_{rx}$ 310 receives energy from the magnetic field 322 generated by the coil $L_2$ 106. This energy induces an electric current in the receiver coil $L_{rx}$ 310. The receiver coil $L_{rx}$ 310 passes energy from the electric current to one or more capacitors $C_{rx}$ 712, which then pass the energy to a receiver PMIC 714. The receiver PMIC 714 uses the energy provided by the one or more capacitors $C_{rx}$ 712 to provide an output voltage $V_{out}$ to a PMIC for charging 716. Additionally, the receiver PMIC 714 can provide load modulation back to the wireless-power transmitter 302 in accordance with Qi wireless-charging protocol. Load modulation signals can pass through the passive adapter 102, from the coil 106 to the coil 104, and on to the wireless-power transmitter 302 via the transmitter coil $L_{tx}$ to enable the wireless-power transmitter 302 to manage the amount of power being transmitted. Additionally, the wireless-power transmitter 302 may provide signals to the wireless-power receiver 304 via the passive adapter 102 by using frequency modulation, such as frequency-shift keying (FSK). These modulated signals may pass through the passive adapter 102, from the coil 104 to the coil 106, and on to the wireless-power receiver 304 via the receiver coil $L_{rx}$ to enable communication (e.g., control signals or feedback signals) from the wireless-power transmitter 302 to the wireless-power receiver 304. The PMIC for charging 716 provides power management for quick charging of a load, such as load 718, by providing a DC current at a voltage level of the load 718.

Figure 8:
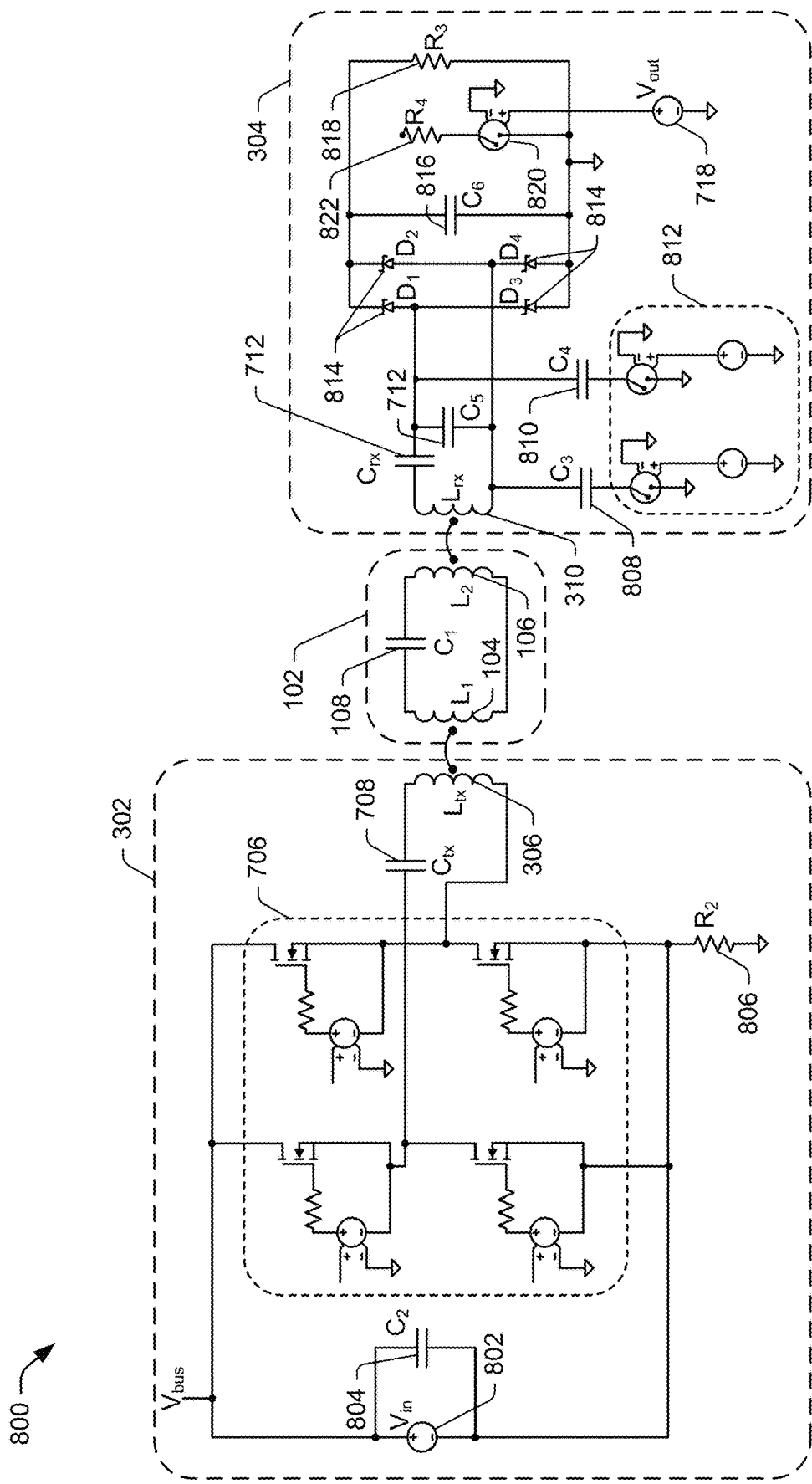
FIG. 8 illustrates an example circuit for implementing a passive adapter for wireless charging of a load.

In further detail, consider FIG. 8, which illustrates an example circuit 800 for implementing a passive adapter for wireless charging of a load. The example circuit 800 includes the wireless-power transmitter 302 magnetically coupled to the passive adapter 102, which is magnetically coupled to the wireless-power receiver 304. As illustrated, the wireless-power transmitter 302 includes a voltage source $V_{in}$ 802, which may be connected in parallel with capacitor $C_2$ 804. The voltage source $V_{in}$ 802 is connected to the full-bridge inverter circuit 706, which is configured for soft switching. The full-bridge inverter circuit 706 includes multiple metal-oxide-semiconductor field-effect transistors (MOSFETs) for switching signals. However, any suitable transistors can be used to build an inverter circuit for soft switching. The soft switching reduces the likelihood of switching losses. The full-bridge inverter circuit 706 is connected to both sides of the transmitter coil $L_{tx}$ 306 via the capacitor $C_{tx}$ 708. The full-bridge inverter circuit 706 is also connected in parallel to one or more resistors, such as resistor $R_2$ 806. The transmitter coil $L_{tx}$ 306 is magnetically coupled to the coil $L_1$ 104 of the passive adapter 102.

The coil $L_1$ 104 is series connected to the capacitor $C_1$ 108 and the coil $L_2$ 106. The coil $L_2$ 106 magnetically couples to the receiver coil $L_{rx}$ 310 of the wireless-power receiver 304. The receiver coil $L_{rx}$ 310 is series connected to the capacitor $C_{rx}$ 712. On each side of the series-connected receiver coil $L_{rx}$ 310 and capacitor $C_{rx}$ 712, an additional capacitor to ground is included, such as capacitors $C_3$ 808 and $C_4$ 810, which are each connected to a communication channel 812 for load modulation, such as the receiver PMIC 714. The load modulation can be implemented according to Qi protocol. The wireless-power receiver 304 includes additional circuitry for using the energy passed from the receiver coil $L_{rx}$ 310 to charge a load. This additional circuitry includes multiple diodes 814 (e.g., $D_1$, $D_2$, $D_3$, and $D_4$), a capacitor $C_6$ 816, a resistor $R_3$ 818, and a switch 820 connected to one or more resistors (e.g., resistor $R_4$ 822) and the load 718. In aspects, the multiple diodes 814 may be replaced with MOSFETs to provide similar functionality. Further, the switch 820 is connected to an output voltage $V_{out}$ 822 source.

Some examples are provided below:

Example 1: A passive adapter for magnetic inductive wireless charging, the passive adapter comprising: a first coil wound to have a first size, the first coil configured to generate an electric current based on exposure of the first coil to a first magnetic field; a capacitor electrically connected to the first coil, the capacitor configured to store energy based on the electric current generated by the first coil; and a second coil electrically connected to the capacitor and the first coil, the second coil wound to have a second size that is different than the first size of the first coil, the second coil configured to generate a second magnetic field based on the stored energy from the capacitor, the second magnetic field generated to transfer the energy to a receiver coil at a device to wirelessly charge the device.

Example 2: The passive adapter of example 1, further comprising a core material positioned between the first and second coils, the core material configured to prevent mutual coupling between the first and second coils.

Example 3: The passive adapter of example 2, wherein the core material has a thickness within a range of approximately 0.5 millimeters to 2.0 millimeters.

Example 4: The passive adapter of any of examples 2 to 3, wherein the first and second coils are wired together by a wire passing through a hole in the core material.

Example 5: The passive adapter of any one of examples 2 to 3, wherein the first and second coils are wired together by a wire passing around an outside edge of the core material.

Example 6: The passive adapter of any preceding example, wherein the first coil has an outer diameter within a range of approximately 40 to 50 millimeters and the second coil has an outer diameter within a range of approximately 18 to 25 millimeters.

Example 7: The passive adapter of any preceding example, wherein: the first coil is size-matched to a transmitter coil of a wireless-charging base; and the second coil is size-matched to the receiver coil of the device.

Example 8: A system for magnetic inductive wireless charging an electronic device, the system comprising: a passive adapter comprising a first coil and a second coil electrically connected via a capacitor to form a resonant circuit, the passive adapter configured to: receive energy based on exposure of the first coil to a magnetic field that induces an electric current in the first coil; temporarily store energy in the capacitor based on the electric current induced in the first coil; pass the stored energy from the capacitor to the second coil; and generate, at the second coil, an additional magnetic field based on the energy passed to the second coil; and a receiver coil magnetically coupled to the second coil, the receiver coil configured to receive, via the additional magnetic field, additional energy that induces a second electric current in the receiver coil. The second electric current is usable to charge a load.

Example 9: The system of example 8, wherein the first coil has an outer diameter within a range of approximately 40 to 50 millimeters and the second coil has an outer diameter within a range of approximately 18 to 25 millimeters.

Example 10: The system of example 8 or example 9, wherein the magnetic field is according to Qi wireless-charging standards.

Example 11: The system of example 10, wherein the magnetic field is based on a frequency range of approximately 80 to 300 kHz.

Example 12: The system of any one of examples 8 to 11, wherein the receiver coil is part of a computing watch, an electronic earbuds case, computing spectacles, a portable audio player, or a digital camera.

Example 13: The system of any one of examples 8 to 12, further comprising a core material that separates the first and second coils, the core material configured to shunt magnetic flux from passing between the first and second coils.

Example 14: The system of any one of examples 8 to 13, further comprising a wireless-power transmitter having a transmitter coil for generating the magnetic field based on an alternating current running through the transmitter coil.

Example 15: The system of any one of examples 8 to 14, wherein the first coil of the passive adapter is size-matched to the transmitter coil; and the second coil of the passive adapter is size-matched to the receiver coil.

Example 16: A system for magnetic inductive wireless charging of an electronic device, the system comprising: a wireless-power transmitter having a first inductive coil for generating a first magnetic field based on an alternating current running through the first inductive coil; a wireless-power receiver having a second inductive coil for generating an electric current, based on exposure to a magnetic field, to charge a load, the second inductive coil having a substantial size mismatch relative to the first inductive coil; and a passive adapter positioned between the first inductive coil and the second inductive coil, the passive adapter comprising: a third inductive coil aligned with the first inductive coil and substantially matching a size of the first inductive coil, the third inductive coil configured to generate energy based on exposure of the third inductive coil to the first magnetic field; a capacitor connected to the third inductive coil, the capacitor configured to temporarily store the energy generated by the third inductive coil; a fourth inductive coil substantially aligned with the second inductive coil and substantially matching a size of the second inductive coil, the fourth inductive coil configured to generate a second magnetic field, based on the energy stored by the capacitor, for the second inductive coil to receive; and a core material positioned between the third inductive coil and the fourth inductive coil, the core material configured to prevent mutual coupling between the third and fourth inductive coils.

Example 17: The system of example 16, wherein the wireless-power receiver includes one or more additional capacitors to ground on each side of the second inductive coil for additional energy storage, the one or more additional capacitors to ground are connected to a communication channel for load modulation.

Example 18: The system of example 17, wherein the load modulation provides signals from the wireless-power receiver to the wireless-power transmitter via the passive adapter.

Example 19: The system of any one of examples 16 to 18, wherein the wireless-power transmitter includes a full-bridge inverter circuit configured for soft switching.

Example 20: The system of any one of examples 16 to 19, wherein the wireless-power receiver is a computing watch, an electronic earbuds case, a portable audio player, or computing spectacles.

Example 21: The system of any one of examples 16 to 20, wherein the core material has a thickness within a range of approximately 0.5 millimeters to 2.0 millimeters.

Example 22: The system of any one of examples 16 to 21, wherein the first inductive coil has an outer diameter within a range of approximately 40 to 50 millimeters and the second inductive coil has an outer diameter within a range of approximately 18 to 25 millimeters.

CONCLUSION

Although aspects of the passive adapter for wireless charging of an electronic device have been described in language specific to features and/or methods, the subject of the appended claims is not necessarily limited to the specific features or methods described. Rather, the specific features and methods are disclosed as example implementations of the passive adapter for wireless charging of an electronic device, and other equivalent features and methods are intended to be within the scope of the appended claims. Further, various different aspects are described, and it is to be appreciated that each described aspect can be implemented independently or in connection with one or more other described aspects.

What is claimed is:

1. A passive adapter for magnetic inductive wireless charging, the passive adapter comprising:
    a first coil wound to have a first size, the first coil configured to generate an electric current based on exposure of the first coil to a first magnetic field;
    a capacitor electrically connected to the first coil, the capacitor configured to store energy based on the electric current generated by the first coil;
    a second coil electrically connected to the capacitor and the first coil, the second coil wound to have a second size that is different than the first size of the first coil, the second coil configured to generate a second magnetic field based on the stored energy from the capacitor, the second magnetic field generated to transfer the energy to a receiver coil at a device to wirelessly charge the device, the second coil including a first core material; and
    a second core material positioned between the first coil and the second coil, the second core material configured to prevent mutual coupling between the first coil and the second coil, the first core material having a first permeability that is different from a second permeability of the second core material.

2. The passive adapter of claim 1, wherein the core material has a thickness within a range of approximately 0.5 millimeters to 2.0 millimeters.

3. The passive adapter of claim 1, wherein the first and second coils are wired together by a wire passing through a hole in the core material.

4. The passive adapter of claim 1, wherein the first and second coils are wired together by a wire passing around an outside edge of the core material.

5. The passive adapter of claim 1, wherein the first coil has an outer diameter within a range of approximately 40 to 50 millimeters and the second coil has an outer diameter within a range of approximately 18 to 25 millimeters.

6. The passive adapter of claim 1, wherein:
    the first coil is size-matched to a transmitter coil of a wireless-charging base; and
    the second coil is size-matched to the receiver coil of the device.

7. A system for magnetic inductive wireless charging of an electronic device, the system comprising:
    a passive adapter comprising a first coil and a second coil electrically connected via a capacitor to form a resonant circuit, the second coil including a first core material, the passive adapter including a second core material positioned between the first coil and the second coil, the second core material configured to prevent mutual coupling between the first coil and the second coil, the first core material having a first permeability that is different from a second permeability of the second core material, the passive adapter configured to:
        receive energy based on exposure of the first coil to a magnetic field that induces an electric current in the first coil;
        temporarily store energy in the capacitor based on the electric current induced in the first coil;
        pass the stored energy from the capacitor to the second coil; and
        generate, at the second coil, an additional magnetic field based on the energy passed to the second coil; and
    a receiver coil magnetically coupled to the second coil, the receiver coil configured to receive, via the additional magnetic field, additional energy that induces a second electric current in the receiver coil, the second electric current usable to charge a load.

8. The system of claim 7, wherein the first coil has an outer diameter within a range of approximately 40 to 50 millimeters and the second coil has an outer diameter within a range of approximately 18 to 25 millimeters.

9. The system of claim 7, wherein the magnetic field is based on a frequency range of approximately 80 to 300 kHz.

10. The system of claim 7, wherein the receiver coil is part of a computing watch, an electronic earbuds case, computing spectacles, a portable audio player, or a digital camera.

11. The system of claim 7, wherein the core material is configured to shunt magnetic flux from passing between the first and second coils.

12. The system of claim 7, further comprising a wireless-power transmitter having a transmitter coil for generating the magnetic field based on an alternating current running through the transmitter coil.

13. The system of claim 12, wherein the passive adapter is configured to passively transfer load modulation signals from the receiver coil to the transmitter coil of the wireless-power transmitter.

14. The system of claim 12, wherein:
the first coil of the passive adapter is size-matched to the transmitter coil; and
the second coil of the passive adapter is size-matched to the receiver coil.

15. A system for magnetic inductive wireless charging of an electronic device, the system comprising:
a wireless-power transmitter having a first inductive coil for generating a first magnetic field based on an alternating current running through the first inductive coil;
a wireless-power receiver having a second inductive coil for generating an electric current, based on exposure to a magnetic field, to charge a load, the second inductive coil having a substantial size mismatch relative to the first inductive coil; and
a passive adapter positioned between the first inductive coil and the second inductive coil, the passive adapter comprising:
a third inductive coil aligned with the first inductive coil and substantially matching a size of the first inductive coil, the third inductive coil configured to generate energy based on exposure of the third inductive coil to the first magnetic field;
a capacitor connected to the third inductive coil, the capacitor configured to temporarily store the energy generated by the third inductive coil;
a fourth inductive coil substantially aligned with the second inductive coil and substantially matching a size of the second inductive coil, the fourth inductive coil configured to generate a second magnetic field, based on the energy stored by the capacitor, for the second inductive coil to receive; and
a core material positioned between the third inductive coil and the fourth inductive coil, the core material configured to prevent mutual coupling between the third and fourth inductive coils, the core material having a first permeability that is different from a second permeability of the fourth inductive coil.

16. The system of claim 15, wherein the wireless-power receiver includes one or more additional capacitors to ground on each side of the second inductive coil for additional energy storage, the one or more additional capacitors to ground are connected to a communication channel for load modulation.

17. The system of claim 16, wherein the load modulation provides signals from the wireless-power receiver to the wireless-power transmitter via the passive adapter.

18. The system of claim 15, wherein the wireless-power transmitter includes a full-bridge inverter circuit configured for soft switching.

19. The system of claim 15, wherein the core material has a thickness within a range of approximately 0.5 millimeters to 2.0 millimeters.

20. The system of claim 15, wherein:
the third inductive coil is size-matched to the first inductive coil; and
the fourth inductive coil is size-matched to the second inductive coil.

* * * * *